UNITED STATES PATENT OFFICE.

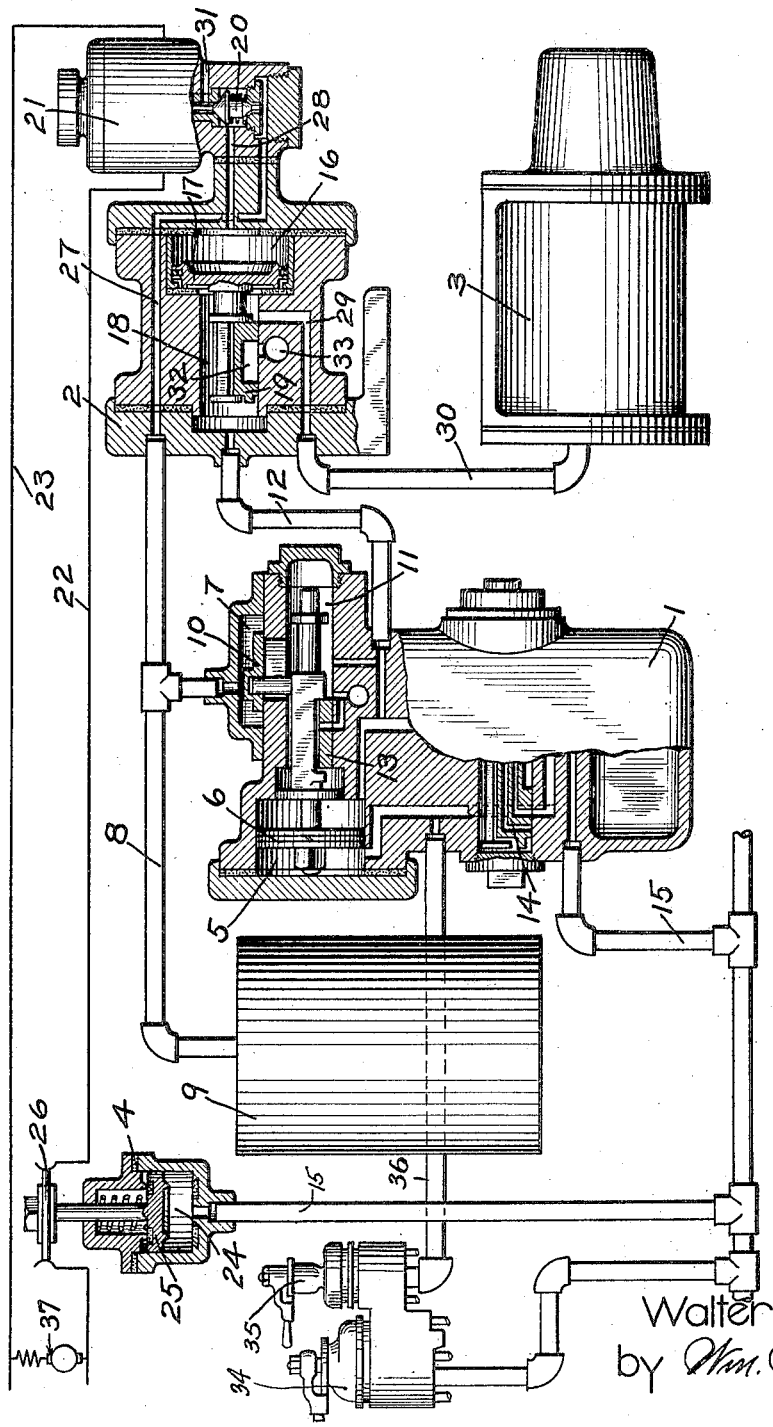

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

REGENERATIVE BRAKE DEVICE.

1,400,840.          Specification of Letters Patent.      Patented Dec. 20, 1921.

Application filed October 8, 1917. Serial No. 195,332.

*To all whom it may concern:*

Be it known that I, WALTER V. TURNER, a citizen of the United States, residing at Wilkinsburg, in the county of Allegheny and State of Pennsylvania, have invented new and useful Improvements in Regenerative Brake Devices, of which the following is a specification.

This invention relates to railway brakes, and more particularly to an equipment in which the brakes may be applied either pneumatically or by means of an electro-regenerative brake apparatus.

With a combined braking system of the above character, it is desirable that only one of the brakes operate at a time, since if both the pneumatic and the electro-regenerative brakes act at the same time, an excessive application of the brakes is liable to be produced.

The principal object of my invention is to provide an improved device for preventing the operation of one brake when the other brake is in action.

In the accompanying drawing, the single figure is a diagrammatic view, partly in section, of a brake apparatus embodying my invention.

According to the construction shown in the drawing, my invention is shown applied in connection with a distributing valve device 1 as heretofore employed in the well-known E. T. locomotive brake equipment for controlling the locomotive brakes, and as fully described in the prior patents of Walter V. Turner, No. 1,039,221, dated September 24, 1912, and No. 1,109,715, dated September 8, 1914, a cut-off valve device 2, a brake cylinder 3 and a pneumatic switch 4.

The distributing valve device 1 comprises a casing having an application cylinder 5 containing a piston 6, a valve chamber 7 connected by a pipe 8 to a source of fluid pressure supply, such as the main reservoir 9 and containing a valve 10, and a valve chamber 11 connected through pipe 12 to the brake cylinder 3 and containing an exhaust controlling valve 13.

The pressure in application cylinder 5 is controlled by an equalizing valve device 14 which is adapted to be controlled by varying the pressure in the usual brake pipe 15, the brake pipe pressure being reduced to effect either a service or an emergency application of the brakes in the usal manner by means of a brake valve device 34 having a pipe connection to the brake pipe 15.

The pressure in the application cylinder 5 is also controlled by the operation of the independent brake valve 35 which is connected to the application cylinder 5 by pipe 36.

The cut-off valve device 2 may comprise a casing having a piston chamber 16 containing a piston 17 and a valve chamber 18 containing a slide valve 19.

The pressure in piston chamber 16 is controlled by a double beat valve 20 adapted to be operated by a magnet 21 connected to circuit wires 22 and 23 of a regenerative brake circuit.

The reference numeral 37 indicates diagrammatically a regenerative brake system and the circuit wires 22 and 23 a circuit which is energized when the regenerative brake is acting. Since a regenerative braking system is quite complicated and includes many parts and since it is not deemed necessary to show such a system in the drawing for a full and complete understanding of the present invention, the regenerative braking system is merely indicated in the drawing as a conventional symbol. A full description of regenerative braking systems may be had from various patents in the prior art, such as, for example, Patent No. 1,245,398 of N. W. Storer, dated November 6, 1917, and Patent No. 1,245,523 of N. W. Storer, dated November 6, 1917.

In operation, if the regenerative brake is inactive, the magnet 21 is deënergized, so that the double beat valves 20 is held in the position shown in the drawing, in which communication is opened for supplying fluid from the reservoir 9 through pipe 8, and passages 27 and 28 to the piston chamber 16. Piston 17 is moved to its inner position by the pressure in chamber 16, so that passage 29 opens communication from valve chamber 18 through passage 29 and pipe 30 to brake cylinder 3.

If the pressure in brake pipe 15 is now reduced to effect a pneumatic application of the brakes, the equalizing valve device 14 is operated to effect the admission of fluid under pressure to application cylinder 5 and the piston 6 is thereupon operated to shift valve 10, so that fluid is supplied from valve chamber 7 and reservoir 9 through pipe 12 to valve chamber 18 of the cut-off valve device and thence flows through the pipe 30 to brake cylinder 3.

If, however, the regenerative brake is operating when the brake pipe pressure is reduced to effect an application of the brakes then the magnet 21 will be energized, so that the double beat valve 20 is shifted to open communication from piston chamber 16 through passage 28 to exhaust port 31 and consequently the piston 17 will be operated by brake cylinder pressure to shift the slide valve 19 and cut off communication from the distributing valve device to the brake cylinder.

In the E. T. locomotive brake equipment the brakes may be applied on the locomotive independently of the train brakes by manipulating the independent brake valve 35 to supply fluid under pressure through pipe 36 to the application cylinder 5. If the brakes have been applied on the locomotive by operation of the independent brake valve in the above manner, since the brake pipe pressure has not been reduced, the switch piston 25 will remain in the position holding the regenerative circuit switch closed, but in this case, if the regenerative brake is operated, the shifting of the piston 17 and slide valve 19 by the venting of fluid from piston chamber 16 through the energization of magnet 21 will operate to connect the brake cylinder through cavity 32 with exhaust port 33, so that any fluid under pressure in the locomotive brake cylinder will be vented to the atmosphere, thus releasing the pneumatic brake on the locomotive, while the regenerative brake is acting.

Furthermore, if during the period that the regenerative brake is acting, it be attempted to apply the pneumatic brakes on the locomotive independently of the train brakes by manipulation of the independent brake valve, it will be evident that the fluid pressure supplied to the valve chamber 18 by the operation of the distributing valve 1 cannot pass to the brake cylinder 3, since the slide valve 19 has been moved to the position cutting off communication from the distributing valve to the brake cylinder.

On the other hand, if the brake pipe pressure is reduced to effect an application of the brakes, throughout the train the piston 25 will then be operated to move switch 26 to its open position, so that the regenerative circuit is thereby opened and consequently, the regenerative brake cannot act while the brakes are applied pneumatically.

Having now described my invention, what I claim as new and desire to secure by Letters Patent, is:—

1. The combination with a regenerative brake and a fluid pressure brake, of means for preventing a fluid pressure brake application when the regenerative brake is acting and means for preventing the regenerative brake from acting upon applying the brakes by fluid pressure.

2. The combination with a regenerative brake, a brake pipe, and a valve device operated upon a reduction in brake pipe pressure for effecting an application of the brakes, of a switch for controlling the regenerative brake and a piston subject to brake pipe pressure for controlling said switch.

3. The combination with a regenerative brake, and a fluid pressure brake, of a valve device for controlling communication through which fluid is supplied to the brake cylinder, means in the regenerative brake circuit for controlling said valve device, and means controlled by the fluid pressure brake for controlling the regenerative brake circuit.

In testimony whereof I have hereunto set my hand.

WALTER V. TURNER.